US010726400B2

(12) United States Patent
Salama et al.

(10) Patent No.: US 10,726,400 B2
(45) Date of Patent: Jul. 28, 2020

(54) HIGH FRAUD RISK TRANSACTION AUTHORIZATION

(71) Applicant: The Toronto-Dominion Bank, Mississauga (CA)

(72) Inventors: Hisham Salama, Charlotte, NC (US); Lauren Van Heerden, Bedford, NH (US); Ian Sundberg, Charlotte, NC (US); Anand Kannan, North York (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1103 days.

(21) Appl. No.: 14/301,082

(22) Filed: Jun. 10, 2014

(65) Prior Publication Data

US 2014/0365377 A1 Dec. 11, 2014

Related U.S. Application Data

(60) Provisional application No. 61/833,443, filed on Jun. 10, 2013, provisional application No. 61/880,432, filed on Sep. 20, 2013.

(51) Int. Cl.
*G06Q 20/10* (2012.01)
*G06Q 20/40* (2012.01)

(52) U.S. Cl.
CPC ........... *G06Q 20/10* (2013.01); *G06Q 20/401* (2013.01); *G06Q 20/4016* (2013.01)

(58) Field of Classification Search
CPC .. G06Q 30/0281; G06Q 40/128; G06Q 50/01; G06Q 20/405; G06Q 10/20;

(Continued)

(56) References Cited

U.S. PATENT DOCUMENTS 5,754,653 A 5/1998 Canfield
5,920,847 A * 7/1999 Kolling ................. G06Q 20/02
705/40

(Continued)

FOREIGN PATENT DOCUMENTS

WO WO 2012/135892 A1 10/2012

OTHER PUBLICATIONS

Bella et al., "Verifying the set registration protocols," Technical Report No. 531 UCAM-CL-TR-531, University of Cambridge Computer Laboratory, 2002 (24 pages).

(Continued)

*Primary Examiner* — Johann Y Choo
(74) *Attorney, Agent, or Firm* — Duane Morris LLP

(57) ABSTRACT

A method of authorizing a transaction involves a computer server authenticating a payment cardholder from a cardholder credential, and receiving a request from a communications terminal to initiate an online transaction with the server. The server communicates with a database of clusters, each uniquely associated with a respective cardholder and identifying an authentication card and a partial payment card number. The server requests an authentication credential from the terminal in response to determining that the requested transaction possesses a high risk of fraud. The server receives the requested authentication credential, and uses the cardholder and authentication credentials to locate the authentication card uniquely associated with the cardholder and the authentication credential in the database. The authentication credential has fewer digits than the account number of the located authentication card. The server authorizes the transaction in response to authenticating the cardholder using the account number of the located authentication card.

17 Claims, 4 Drawing Sheets

(58) Field of Classification Search
CPC .. G06Q 20/14; G06Q 20/108; G06Q 20/3572; G06Q 20/4016; G06Q 30/0274; G06Q 20/341; G06Q 20/3674; G06Q 30/06; G06Q 30/0631; G06Q 20/42; G06Q 20/367

See application file for complete search history.

(56) References Cited

U.S. PATENT DOCUMENTS

| | | | |
|---|---|---|---|
| 7,810,720 | B2 | 10/2010 | Lovett |
| 7,835,988 | B2 | 11/2010 | Horvath et al. |
| 8,140,418 | B1 | 3/2012 | Casey et al. |
| 8,229,848 | B2 | 7/2012 | Krueger et al. |
| 8,290,875 | B2 | 10/2012 | Itoi et al. |
| 8,434,133 | B2 | 4/2013 | Kulkarni et al. |
| 8,453,925 | B2 | 6/2013 | Fisher et al. |
| 8,494,959 | B2 | 7/2013 | Hathaway et al. |
| 8,595,812 | B2 | 11/2013 | Bomar et al. |
| 8,615,468 | B2 | 12/2013 | Varadarajan |
| 8,688,543 | B2 | 4/2014 | Dominguez |
| 2002/0095589 | A1 | 7/2002 | Keech |
| 2003/0004876 | A1* | 1/2003 | Jacobson ............. G06Q 20/105 705/41 |
| 2004/0030659 | A1 | 2/2004 | Gueh |
| 2004/0243520 | A1* | 12/2004 | Bishop ................. G06Q 20/341 705/75 |
| 2005/0102234 | A1* | 5/2005 | Devine ............. G06Q 20/3674 705/44 |
| 2007/0050255 | A1 | 3/2007 | Hobbs et al. |
| 2008/0208697 | A1* | 8/2008 | Kargman ............. G06Q 20/204 705/17 |
| 2008/0270301 | A1 | 10/2008 | Jones et al. |
| 2010/0057623 | A1 | 3/2010 | Kapur et al. |
| 2010/0076891 | A1 | 3/2010 | Vanmoor |
| 2010/0299267 | A1 | 11/2010 | Faith et al. |
| 2011/0137804 | A1* | 6/2011 | Peterson ............. G06Q 20/085 705/77 |
| 2011/0153461 | A1 | 6/2011 | Royyuru |
| 2011/0270757 | A1 | 11/2011 | Hammad |
| 2012/0072346 | A1 | 3/2012 | Mirit et al. |
| 2012/0102554 | A1 | 4/2012 | Emerick et al. |
| 2012/0109818 | A1 | 5/2012 | Carlson et al. |
| 2012/0143770 | A1* | 6/2012 | Pauker .................. G06Q 20/02 705/71 |
| 2012/0239572 | A1 | 9/2012 | Wolfs et al. |
| 2012/0284035 | A1* | 11/2012 | Gillin .................... G06Q 30/02 705/1.1 |
| 2012/0317018 | A1 | 12/2012 | Barnett |
| 2012/0317628 | A1 | 12/2012 | Yeager |
| 2013/0008956 | A1 | 1/2013 | Ashfield |
| 2013/0144776 | A1 | 6/2013 | Webster et al. |
| 2013/0198082 | A1 | 8/2013 | Eichner |
| 2013/0198838 | A1 | 8/2013 | Schmidt et al. |
| 2013/0275308 | A1* | 10/2013 | Paraskeva ............. G06Q 20/32 705/71 |
| 2014/0008434 | A1 | 1/2014 | de Geer et al. |
| 2014/0081784 | A1 | 3/2014 | Ahn |
| 2016/0232520 | A9* | 8/2016 | Singhal ................. G06Q 20/02 |

OTHER PUBLICATIONS

Bella et al., "Formal verification of cardholder registration in Set," Computer Security—ESORICS 2000, pp. 159-174.

Xiao et al., "A purchase protocol with live cardholder authentication for online credit card payment," Proceedings—The 4th International Symposium on Information Assurance and Security, IAS 2008, pp. 15-20.

Oliveira et al., "The power of credit card numbers and long cvvs," 5th International Conference on Date Network and System Security (NSS), Sep. 2011, pp. 290-294.

Abbass et al., "Building a trust model for generating and validating assurance keys between consumers in e-commerce," International Journal of Computer Applications, vol. 57, No. 1, 2012, pp. 17-25.

Buccafurri, et al., "Implementing disposable credit card numbers by mobile phones," Electronic Commerce Research, vol. 11, No. 3, Sep. 2011, pp. 271-296.

Graefe, et al., "Credit card transaction security," Proceedings of the 4th Annual Conference on Information Security Curriculum Development, 2007 (6 pages).

* cited by examiner

HIGH FRAUD RISK TRANSACTION AUTHORIZATION

TECHNICAL FIELD

This patent application relates to a method and system for authorizing transactions.

BACKGROUND

Online banking often requires the payment cardholder to provide the cardholder's financial institution server with the cardholder's username and password to authenticate to the financial institution server. Relying on the username and password for cardholder authentication creates a serious risk of fraud, particularly for high value financial transactions.

SUMMARY

This patent application discloses a system and method that uses a partial payment card number associated with a cardholder to authorize a transaction that has an inherent high risk of fraud.

In accordance with a first aspect of the disclosure, there is provided a method of authorizing a transaction. The method involves at least one computer server authenticating a payment cardholder from a cardholder credential that is received from a communications terminal, and receiving from the communications terminal a request to initiate an online transaction with the at least one computer server. The at least one computer server is in communication with a database comprising a plurality of database clusters each uniquely associated with a respective payment cardholder. Each database cluster identifies a unique account number of an authentication card that is issued to the payment cardholder, and a partial payment card number of at least one payment card that is associated with the authentication card. Each partial payment card number has fewer digits than the associated unique account number.

The at least one computer server requests an authentication credential from the communications terminal in response to determining that the requested online transaction possesses an inherent high risk of fraud. In response to the authentication credential request, the at least one computer server receives an authentication credential from the communications terminal, and uses the received cardholder credential and the received authentication credential to locate the authentication card that is uniquely associated with the payment cardholder and the received authentication credential in the database. The received authentication credential has fewer digits than the account number of the located authentication card.

The at least one computer server authorizes the requested online transaction in response to authenticating the payment cardholder using the account number of the located authentication card.

In accordance with a second aspect of the disclosure, there is provided s transaction authorization system that includes a database and at least one computer server in communication with the database. The database comprises a plurality of database clusters, each uniquely associated with a respective payment cardholder. Each database cluster identifies a unique account number of an authentication card that is issued to the payment cardholder, and a partial payment card number of at least one payment card that is associated with the authentication card. Each partial payment card number has fewer digits than the associated unique account number.

The at least one computer server is configured to authenticate a payment cardholder from a cardholder credential received from a communications terminal, to receive from the communications terminal a request to initiate an online transaction with the computer server, and to request an authentication credential from the communications terminal in response to determining that the requested online transaction possesses an inherent high risk of fraud.

The at least one computer server is configured to receive, in response to the authentication credential request, an authentication credential from the communications terminal, and to use the received cardholder credential and the received authentication credential to locate the authentication card that is uniquely associated with the payment cardholder and the received authentication credential in the database. The received authentication credential has fewer digits than the account number of the located authentication card. The at least one computer server is also configured to authorize the requested online transaction in response to authenticating the payment cardholder using the account number of the located authentication card.

The authentication credential may further comprise at least one of an expiration date and a card security code.

In a preferred implementation, the transaction authorization system is configured to determine that the requested online transaction possesses a high risk of fraud by determining that the online transaction involves a transfer or payment of a large monetary amount or opening a new financial account. The authorization system receives the cardholder credential via a first communications channel established with the communications terminal, and receives the authentication credential via a second communications channel established with the communications terminal, the second communications channel being distinct from the first communications channel. The authorization system also receives the request to initiate an online transaction via the first communications channel.

The transaction authorization system may authenticate the payment cardholder using the account number of the located authentication card by issuing an authorization request for a financial transaction with the account number of the authentication card, receiving an authorization response in response to the authorization request, and authenticating the payment cardholder in accordance with an outcome of the authorization request. The authorization request may comprise a request for authorization of a financial transaction for a transaction amount using the account number of the located authentication card.

Since authentication of the cardholder is initiated using partial payment card data that, without more, cannot be used to complete a financial transaction, the method may reduce the possibility of fraudulent transactions.

BRIEF DESCRIPTION OF THE DRAWINGS

An exemplary authentication server, and method of authorizing an online transaction will now be described, with reference to the accompanying drawings, in which.

DETAILED DESCRIPTION

Cardholder Authentication Network

Figure 1:
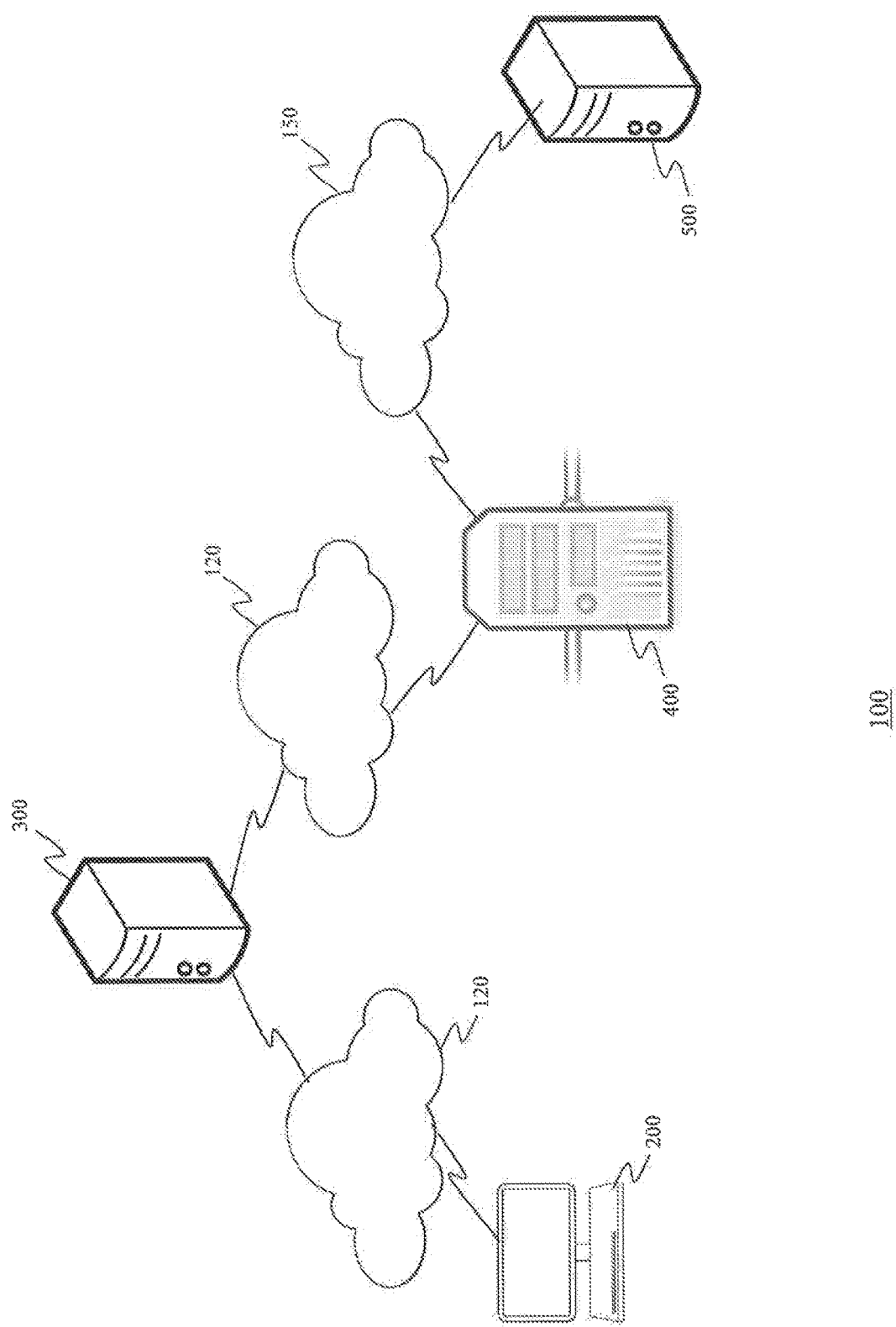
FIG. 1 is a schematic view of a cardholder authentication network, depicting a communications terminal, an authentication server, and a payment card issuer server, in accordance with disclosed embodiments.

FIG. 1 is a schematic view of a cardholder authentication network, denoted generally as 100. As shown, the cardholder authentication network 100 comprises a communications terminal 200, an online banking server 300, an authentication server 400, and an issuer server 500. The cardholder authentication network 100 also includes a communications network 120 that facilitates communication between the communications terminal 200 and the online banking server 300.

The cardholder authentication network 100 may also include a communications network 130 that facilitates communication between the online banking server 300 and the authentication server 400, and a communications network 150 that facilitates communication between the authentication server 400 and the issuer server 500. As an example, the communications network 150 may comprise VisaNet or the Mastercard Network.

Although the cardholder authentication network 100 is shown comprising the online banking server 300 distinct from the authentication server 400, the functionality of the online banking server 300 and the authentication server 400 may be incorporated into a single common server. Further, although the cardholder authentication network 100 is shown comprising only a single communications terminal 200, a single online banking server 300, and a single authentication server 400, the cardholder authentication network 100 typically comprises a plurality of the communications terminals 200, a plurality of the online banking servers 300 and a plurality of the authentication servers 400.

Communications Terminal

Each communications terminal 200 may be implemented as a personal computer or a mobile communications device, and typically includes a display device, user input device, and a data processing system. The user input device may be provided as a keyboard, biometric input device (e.g. microphone) and/or a touch-sensitive layer provided on the display. The data processing system typically comprises a microprocessor, a communication sub-system and a tangible, non-transitory memory. The communication sub-system allows the communications terminal 200 to communicate with the authentication server 300 via the communications network 120.

The memory includes computer processing instructions stored thereon which, when accessed from the memory and executed by the microprocessor, implement an operating system that is configured to display output on the display, to receive user input from the input device, and to send communication signals to and receive communication signals from the authentication server 300 via its communication sub-system.

Online Banking Server

The online banking server 300 typically comprises a web-based computer server that is configured to communicate with the communications terminals 200 via the communications network 120. The online banking server 300 is typically deployed by a financial institution for which a payment card issuer issues payment cards (e.g. debit cards, credit cards) to clients ("cardholders") of the financial institution.

The online banking server 300 maintains a cardholder database that includes a plurality of clusters each associated with a respective payment cardholder. Each cluster of the cardholder database typically identifies one or more cardholder credentials (e.g. username, payment card number) that the cardholder uses to authenticate to the online banking server 300.

The financial institution also maintains a plurality of financial accounts each associated with a respective cardholder. Each financial account may comprise any of a savings account, a credit card account and a line of credit account. The online banking server 300 maintains an accounts database that includes a plurality of clusters each associated with a respective financial account. Each cluster of the accounts database typically comprises a plurality of database records, each identifying a credit/deposit entry to the associated financial account, and the online banking server 300 is configured to post credits and debits to the respective financial accounts via the accounts database.

As will be discussed below, the online banking server 300 is configured to authenticate a payment cardholder from a cardholder credential that is received from one of the communications terminals 200, to receive from the communications terminal 200 a request to initiate an online "card-not-present" transaction with the banking server 300, and to determine whether the requested online transaction initiated with the online banking server 300 possesses an inherent high risk of fraud. The online banking server 300 relies on an authentication response message received from the authentication server 400 to determine whether to proceed with such a high risk online transaction. As used herein, a "card-not-present" online transaction is a transaction in which the operator of the communications terminal 200 uses a payment card to complete the transaction with the online banking server 300 but is not physically present at (i.e. the communications terminal 200 is situated at a location remote from) the premises of the financial institution associated with the online banking server 300. A "high risk" transaction is a transaction that the financial institution has predetermined to possess an inherent high risk of fraud, such as, but not limited to, a transfer or payment for a large monetary amount, and the opening of a new financial account.

Authentication Server

The authentication server 400 may include a computer server that is configured to communicate with the online banking server 300 via the communications network 130. The authentication server 400 is typically deployed by the financial institution that deployed the online banking server 300.

Figure 2:
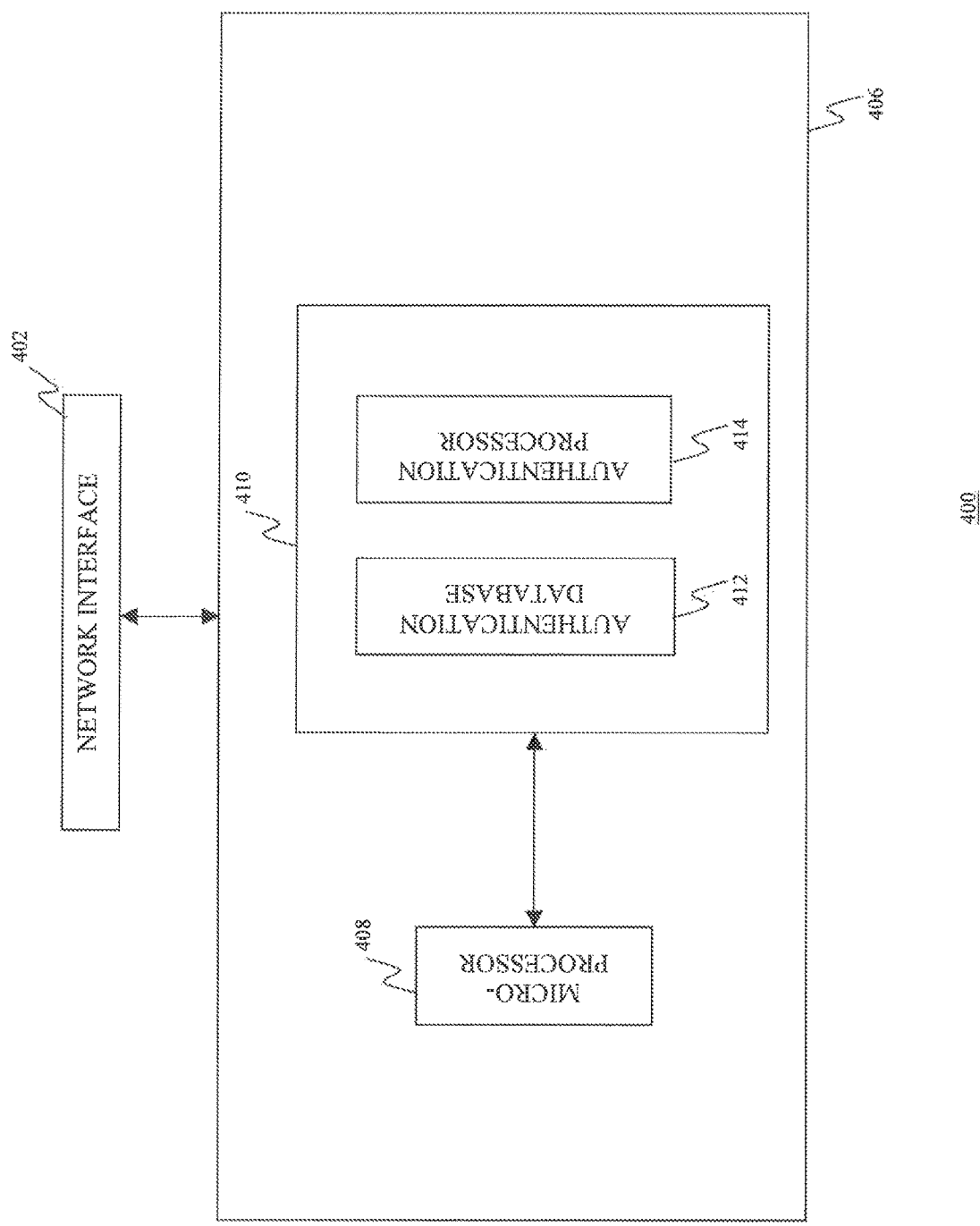
FIG. 2 is a schematic view of an exemplary authentication server, in accordance with disclosed embodiments.

As shown in FIG. 2, the authentication server 400 includes a network interface 402, and a computer processing system 406 that is coupled to the network interface 402. The network interface 402 interfaces the authentication server 400 with the communications network 130 to thereby allow the authentication server 400 to communicate with the online banking server 300. The network interface 402 also interfaces the authentication server 400 with the communications network 150 to thereby allow the authentication server 400 to communicate with the issuer server 500.

The computer processing system 406 may include one or more microprocessors 408 and a tangible, non-transitory computer-readable medium 410. The computer-readable medium 410 may be provided as electronic computer memory (e.g. flash memory) or optical or magnetic memory (e.g. compact disc, hard disk). The computer-readable medium 410 maintains an authentication database 412 that includes a plurality of clusters, each uniquely associated with a cardholder of the financial institution.

Preferably, each database cluster of the authentication database 412 identifies a cardholder credential (e.g. username/card number, passcode) that is uniquely associated with the cardholder, and a credit card that is issued to the cardholder. The database cluster identifies the unique credit card number (Primary Account Number or "PAN") of the credit card, and the expiry date of the credit card. Typically, each credit card number consists of 15 or 16 digits, including the issuer identification number. As will be discussed, the authentication server 400 uses the 15- or 16-digit PAN identified in the authentication database 412 to authenticate the cardholder of the credit card and thereby authorize a high risk transaction. Therefore, each of the credit cards is referred to herein as an "authentication card".

Each database cluster of the authentication database 412 also includes one or more partial payment card numbers of payment cards ("associated payment cards") that are issued by a payment card issuer, on behalf of the financial institution, to the cardholder of the authentication card. Each partial payment card number comprises a portion of the digits of the payment card number of the associated payment card, and has fewer digits than the payment card number of the associated payment card, and has fewer digits than the unique PAN of the authentication card. One or more of the partial payment card numbers may be a portion of the digits of the PAN of the authentication card (i.e. fewer digits than the account number of the authentication card).

Preferably, each partial payment card number excludes the issuer identification number of the associated payment card. As examples, each partial payment card number may comprise the final 8 digits of the 15- or 16-digit PAN of the associated payment card, or either of the two final groups of 4 digits of the PAN of the associated payment card. Each database cluster of the authentication database 412 may also identify the card security code (e.g. Card Verification Value (CVV), CVV2, Card Verification Code (CVC), Card Identification Number (CID)) and expiry date of the associated payment card.

The tangible, non-transitory computer-readable medium 410 also maintains computer processing instructions stored thereon which, when executed by the microprocessor(s) 408, define an operating system (not shown) that controls the overall operation of the authentication server 400. The computer processing instructions, when executed by microprocessor(s) 408, also implement an authentication processor 414.

The authentication processor 414 is configured to request an authentication credential from the communications terminal 200 in response to the banking server 300 determining that the requested online transaction possesses an inherent high risk of fraud.

The authentication processor 414 is configured to receive, in response to the authentication credential request, an authentication credential from the communications terminal, and to use the received cardholder credential and the received authentication credential to locate the authentication card that is uniquely associated with the payment cardholder and the received authentication credential in the database. The received authentication credential has fewer digits than the account number of the located authentication card.

The authentication processor 414 may also be configured to authorize the requested online transaction in response to authenticating the payment cardholder using the account number of the located authentication card.

Although the authentication processor 414 may be implemented as computer processing instructions, all or a portion of the functionality of the authentication processor 414 may be implemented instead in electronics hardware.

Issuer Server

The issuer server 500 may include a computer server that is configured to communicate with the authentication server 400 via the communications network 150. The issuer server 500 is typically deployed by a credit card issuer, and maintains a plurality of accounts each uniquely associated with a respective credit card.

The issuer server 500 maintains an accounts database that includes a plurality of clusters each associated with a respective credit card. Each database cluster typically identifies the 15- or 16-PAN and expiry date of the credit card that is associated with the respective account, the cardholder name, and the current financial balance of the account.

Method of Authorizing Payment Card-Based Transactions

Figure 3:
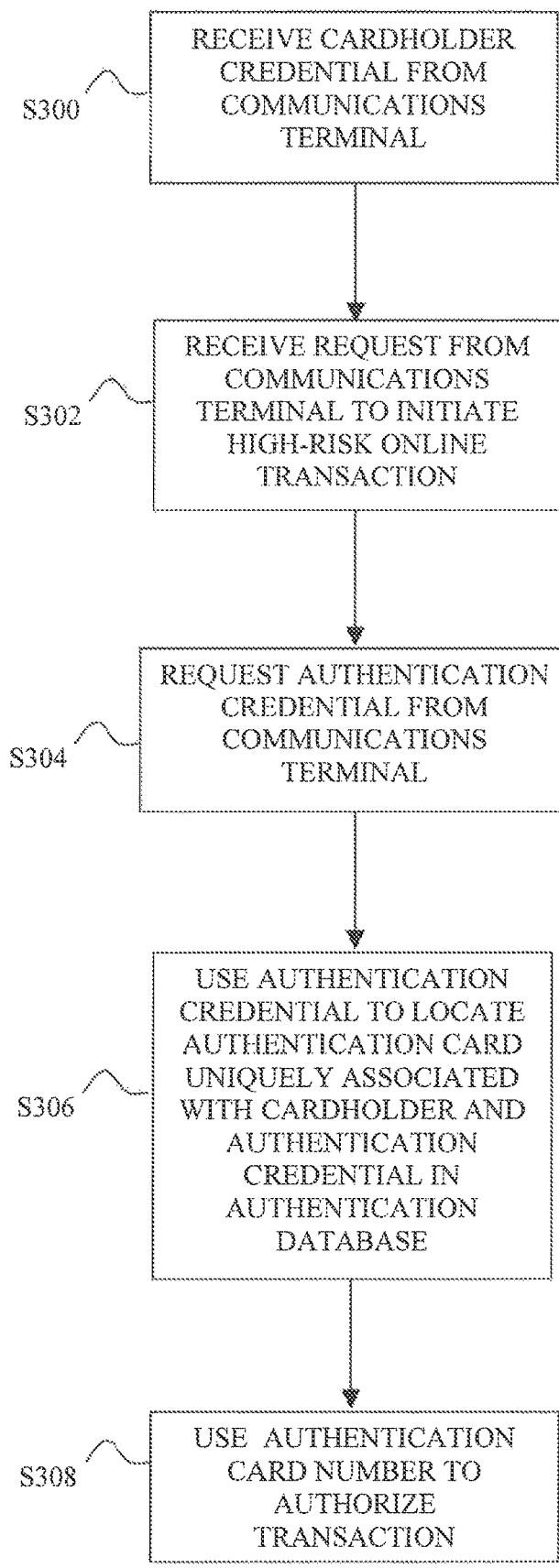
FIG. 3 is flow chart of a method for authorizing a high risk online transaction, in accordance with disclosed embodiments.

As discussed, one or more of the components of the cardholder authentication network 100 implement a method of authorizing an online transaction. As depicted, by way of overview, in FIG. 3, at step S300 the online banking server 300 authenticates a payment cardholder from a cardholder credential that is received from one of the communications terminals 200. At step S302, the banking server 300 receives from the communications terminal 200 a request to initiate an online transaction with the online banking server 300.

In response to the banking server 300 determining that the requested online transaction possesses an inherent high risk of fraud, at step S304 the authentication server 400 (or the banking server 300, if the functionality of the authentication server 400 is incorporated into the banking server 300) requests an authentication credential from the communications terminal 200. As discussed, the authentication server 400 is in communication with the authentication database 412, which comprises a plurality of database clusters each uniquely associated with a respective payment cardholder. Each database cluster identifies a unique account number of an authentication card that is issued to the payment cardholder, and a partial payment card number of at least one payment card that is associated with the authentication card. Each partial payment card number has fewer digits than the associated unique account number.

In response to the authentication credential request, at step S306 the authentication server 400 (or the banking server 300) receives an authentication credential from the communications terminal 200, and uses the received cardholder credential and the received authentication credential to locate the authentication card that is uniquely associated with the payment cardholder and the received authentication credential in the authentication database 412. The received authentication credential has fewer digits than the account number of the located authentication card. At step S308, the authentication server 400 (or the banking server 300) authorizes the requested online transaction in response to authenticating the payment cardholder using the account number of the located authentication card.

Figure 4:
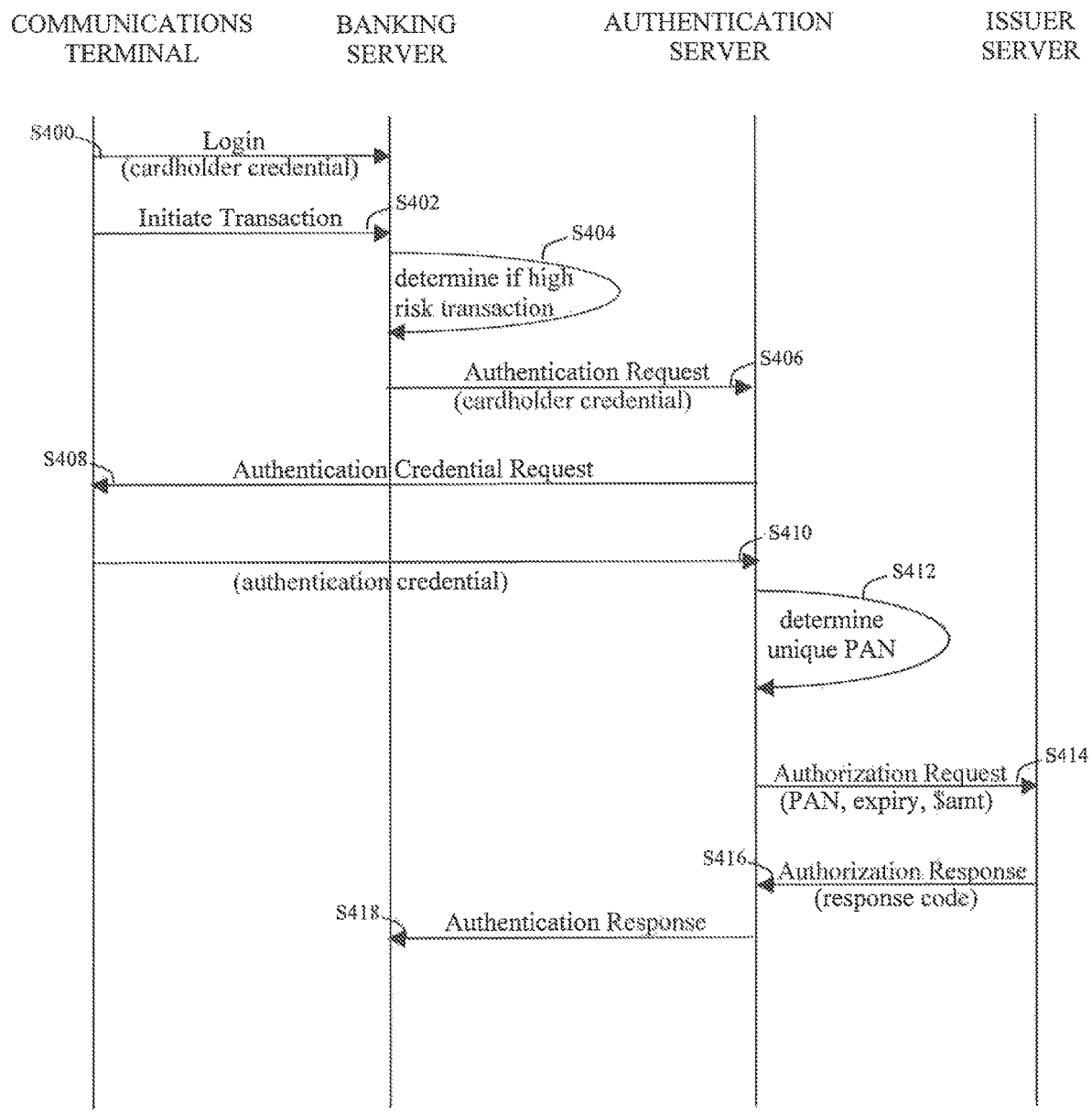
FIG. 4 is a message flow diagram of a method for authorizing a high risk online transaction, in accordance with disclosed embodiments.

A sample method of authenticating a payment cardholder will now be discussed in detail with reference to FIG. 4. At the outset of the method, a payment cardholder uses one of the communications terminal 200 to establish an encrypted communications channel (e.g. SSL/TLS connection) with the online banking server 300, via the communications network 120. At step S400, the cardholder uses the communications terminal 200 to login or authenticate to the online banking server 300 by transmitting to the online banking server 300, via the communications channel, the cardholder credentials (e.g. username, payment card number) that the cardholder normally uses to initiate online banking with the online banking server 300.

The online banking server 300 may use the cardholder database to validate the cardholder credentials. Based on the outcome of the validation process, the online banking server 300 may grants the cardholder access to the financial accounts that are associated with the cardholder in the accounts database.

After the online banking server 300 grants the cardholder access to the cardholder's financial accounts, at step S402 the cardholder may use the communications terminal 200 to initiate a card-not-present online transaction with the online banking server 300 via the communications channel that was established with the online banking server 300. As examples of card-not-present online transactions, the cardholder may pay a bill from one of the cardholder's financial accounts or transfer funds between financial accounts.

If the cardholder initiates a card-not-present online transaction with the online banking server 300, at step S404 the online banking server 300 determines whether the transaction is a high risk transaction. If the online banking server 300 determines that the card-not-present online transaction is not a high risk transaction, the online banking server 300 proceeds with the transaction. However, if the online banking server 300 determines that the transaction is a high risk transaction (e.g. the transaction involves a transfer or payment of a large monetary amount, or opening a new financial account), the online banking server 300 generates an authentication request message that includes one of the cardholder credentials, and sends the authentication request message to the authentication server 400, at step S406, requesting that the authentication server 400 authenticate the cardholder. Typically, the authentication request message includes the payment card number that the online banking server 300 received from the communications terminal 200 at step S400.

At step S408, the authentication server 400 generates an authentication credential request, and sends the authentication credential request to the communications terminal 200, via the online banking server 300. Upon receipt of the authentication credential request, the communications terminal 200 generates a "pop-up" message on the display device of the communications terminal 200, requesting that the cardholder provide the authentication server 400 with an authentication credential that authenticates the cardholder to the authentication server 400.

Preferably, the authentication credential comprises the partial payment card number of one of the payment cards that is associated with cardholder's authentication card in the authentication database 412. As discussed, the partial payment card number may comprise the final 8 digits of the 15- or 16-PAN of the associated payment card, or either of the two final groups of 4 digits of the PAN of the associated payment card. The authentication credential may also include the expiry date and/or the card security code of the partial payment card.

Preferably, the communications terminal 200 establishes an "out-of-band" communications channel with the authentication server 400 (i.e. a communications channel that is distinct from the communications channel that was established with the online banking server 300 at step S400). After the cardholder inputs the authentication credential into the communications terminal, the communications terminal 200 sends the authentication credential to the authentication server 400 over the out-of-band communications channel (e.g., at step S410).

The authentication credential request may include Javascript code which, when executed by the data processing system of the communications terminal 200, establishes the out-of-band communications channel, opens a new data input window for receiving the authentication credential, and sends the authentication credential to the authentication server 400 over the out-of-hand communications channel. The data processing system may generate a string from the partial payment card number, and the expiry date and/or card security code, and include the string in the authentication credential. Alternately, the data processing system may generate a hash value from the partial payment card number, expiry date and/or card security code, and include the generated hash value in the authentication credential.

Upon receipt of the authentication credential from the communications terminal 200, at step S412 the authentication server 400 uses the cardholder credential. (e.g., as received at step S406) and the received authentication credential to locate in the authentication database 412 the authentication card that is uniquely associated with the payment cardholder and with the received authentication credential in the authentication database 412. To do so, the authentication server 400 may query the authentication database 412 with the received cardholder credential to locate the database cluster that is uniquely associated with the payment cardholder, and may query the located database cluster with the authentication credential for the payment card number of the authentication card (i.e. for an entry that matches the authentication credential for the cardholder).

If the authentication database 412 does not include an entry that matches the authentication credential for the cardholder (i.e. an entry that is uniquely associated with the authentication credential and the cardholder credential), the authentication server 400 may generate an error message and transmit the error message to the online banking server 300. Alternately, the authentication database 412 may include an error counter associated with each authentication card, and may prohibit future use of any of the associated payment cards on the cardholder authentication network 100 if the error counter associated with the authentication card reaches a predetermined maximum limit.

If the authentication database 412 includes an entry that matches the authentication credential for the cardholder, the query returns the 15- or 16-digit PAN of the authentication card and the expiry date of the authentication card. The authentication server 400 then uses the PAN and expiry date of the authentication card to authenticate the cardholder. To do, the authentication server 400 generates an authorization request for authorization of a financial transaction using the authentication card, and sends the authorization request to the issuer server 500, via the communications network 150, at step S414, requesting authorization for the financial transaction. The authorization request includes the PAN and expiry date of the authentication card, and specifies a transaction amount for the financial transaction, Preferably, the transaction amount is zero.

Upon receipt of the authorization request, the issuer server 500 authorizes the financial transaction in the usual manner, for example by verifying that the PAN specified in the authorization request is valid, and that the authentication card has not expired or been revoked. The issuer server 500 then generates an authorization response (either authorizing or declining the financial transaction), and transmits the authorization response to the authentication server 400, at step S416.

The authentication server 400 responds to the authentication request message (e.g., received from the online banking server 300 at step S404) by generating an authentication response message from the authorization response, and transmitting the authentication response message to the online banking server 300, at step S418. If the authorization response authorized the financial transaction, the authentication response message confirms that the cardholder was successfully authenticated. Otherwise, the authentication response message does not confirm that the cardholder was authenticated.

If the authentication response message confirms that the cardholder was successfully authenticated, the online banking server 300 proceeds with the high risk card-not-present online transaction that was initiated by the cardholder at step S402. Otherwise, the online banking server 300 terminates the high risk card-not-present online transaction.

The invention claimed is:

1. A method of authorizing a transaction with at least one computer server, the at least one computer server being in communication with a database comprising a plurality of database clusters each uniquely associated with a respective payment cardholder, each said database cluster identifying a unique account number of an authentication card issued to the payment cardholder, and a partial payment card number of at least one payment card associated with the authentication card, each said partial payment card number having fewer digits than the associated unique account number, the method comprising:
   the at least one computer server receiving cardholder credentials from a communications terminal, authenticating a payment cardholder from the cardholder credentials, and receiving from the communications terminal a request to initiate a card-not-present online transaction with the at least one computer server, the card-not-present online transaction comprising opening of a new financial account;
   the at least one computer server determining that the requested card-not-present online transaction possesses an inherent high risk of fraud and requesting an authentication credential from the communications terminal;
   in response to the authentication credential request, (i) the communications terminal prompting for entry of one of the partial payment card numbers, and generating an authentication credential from the entered partial payment card number, and (ii) the at least one computer server receiving the authentication credential from the communications terminal and locating the authentication card uniquely associated with the payment cardholder and the received authentication credential in the database by querying the database with the received cardholder credentials and the received authentication credential, the received authentication credential having fewer digits than the account number of the located authentication card;
   the at least one computer server authenticating the payment cardholder using the account number of the located authentication card, the authenticating the payment cardholder comprising (i) issuing an authorization request for a financial transaction with the account number of the authentication card, (ii) in response to the authorization request receiving an authorization response confirming that the financial transaction was authorized, and (iii) from the authorization response generating a confirmation of authentication of the payment cardholder"; and
   the at least one computer server authorizing the opening of the new financial account in response to the confirmation of authentication of the payment cardholder.

2. The method according to claim 1, wherein the determining that the requested card-not-present online transaction possesses a high risk of fraud comprises the at least one computer server determining that the online transaction involves one of a transfer or payment of a large monetary amount and opening a new financial account.

3. The method according to claim 1, wherein the at least one computer server receives the cardholder credentials via a first communications channel established with the communications terminal, and receives the authentication credential via a second communications channel established with the communications terminal, the second communications channel being distinct from the first communications channel.

4. The method according to claim 3, wherein the at least one computer server receives the request to initiate the card-not-present online transaction via the first communications channel.

5. The method according to claim 3, wherein the authorization request comprises a request for authorization of a financial transaction for a transaction amount using the account number of the located authentication card.

6. The method according to claim 5, wherein the transaction amount is zero.

7. The method according to claim 1, wherein the received authentication credential further comprises at least one of an expiration date and a card security code.

8. A transaction authorization system comprising:
   a database comprising a plurality of database clusters each uniquely associated with a respective payment cardholder, each said database cluster identifying a unique account number of an authentication card issued to the payment cardholder, and a partial payment card number of at least one payment card associated with the authentication card, each said partial payment card number having fewer digits than the associated unique account number; and
   at least one computer server in communication with the database and being configured to:
   receive cardholder credentials from a communications terminal, authenticate a payment cardholder from the cardholder credentials, and receive from the communications terminal a request to initiate a card-not-present online transaction with the computer server, the card-not-present online transaction comprising opening of a new financial account;
   determine that the requested card-not-present online transaction possesses an inherent high risk of fraud and request an authentication credential from the communications terminal;
   in response to the authentication credential request, receive from the communications terminal an authentication credential generated by the communications terminal from one of the partial payment card numbers, and locate the authentication card uniquely associated with the payment cardholder and the received authentication credential in the database by querying the database with the received cardholder credentials and the received authentication credential, the received authentication credential having fewer digits than the account number of the located authentication card;

authenticate the payment cardholder using the account number of the located authentication card, the authenticating the payment cardholder comprising (i) issuing an authorization request for a financial transaction with the account number of the authentication card, (ii) in response to the authorization request receiving an authorization response confirming that the financial transaction was authorized, and (iii) from the authorization response generating a confirmation of authentication of the payment cardholder"; and authorize the opening of the new financial account in response to the confirmation of authentication of the payment cardholder.

9. The authorization system according to claim 8, wherein the least one computer server is configured to determine that the requested online transaction possesses a high risk of fraud by determining that the card-not-present online transaction involves one of a transfer or payment of a large monetary amount and opening a new financial account.

10. The authorization system according to claim 8, wherein the at least one computer server receives the cardholder credentials via a first communications channel established with the communications terminal, and receives the authentication credential via a second communications channel established with the communications terminal, the second communications channel being distinct from the first communications channel.

11. The authorization system according to claim 10, wherein the at least one computer server receives the request to initiate card-not-present online transaction via the first communications channel.

12. The authorization system according to claim 10, wherein the authorization request comprises a request for authorization of a financial transaction for a transaction amount using the account number of the located authentication card.

13. The authorization system according to claim 12, wherein the transaction amount is zero.

14. The authorization system according to claim 8, wherein the authentication credential further comprises at least one of an expiration date and a card security code.

15. A tangible non-transient computer-readable medium carrying computer processing instructions stored thereon which, when executed by at least one computer server, cause the at least one computer server to:

receive cardholder credentials from a communications terminal, authenticate a payment cardholder from the cardholder credentials, and receive from the communications terminal a request to initiate a card-not-present online transaction with the at least one computer server, the card-not-present online transaction comprising opening of a new financial account;

determine that the requested card-not-present online transaction possesses an inherent high risk of fraud and request an authentication credential from the communications terminal;

in response to the authentication credential request, receive from the communications terminal an authentication credential generated by the communications terminal from a payment card number of a payment card, the payment card being associated with a respective payment cardholder in a database accessible to the at least one computer server, the database comprising a plurality of database clusters each uniquely associated with one of the payment cardholders, each said database cluster identifying a unique account number of an authentication card and a partial payment card number associated with the authentication card, each said partial payment card number having fewer digits than the associated unique account number, locate the authentication card uniquely associated with the payment cardholder and the received authentication credential in the database by querying the database with the received cardholder credentials and the received authentication credential, the received authentication credential having fewer digits than the account number of the located authentication card;

authenticate the payment cardholder using the account number of the located authentication card, the authenticating the payment cardholder comprising (i) issuing an authorization request for a financial transaction with the account number of the authentication card, (ii) in response to the authorization request receiving an authorization response confirming that the financial transaction was authorized, and (iii) from the authorization response generating a confirmation of authentication of the payment cardholder"; and authorize the opening of the new financial account in response to the confirmation of authentication of the payment cardholder.

16. The computer-readable medium according to claim 15, wherein the at least one computer server receives the cardholder credentials via a first communications channel established with the communications terminal, and receives the authentication credential via a second communications channel established with the communications terminal, the second communications channel being distinct from the first communications channel.

17. The computer-readable medium according to claim 16, wherein the authorization request comprises a request for authorization of a financial transaction for a transaction amount using the account number of the located authentication card, and wherein the transaction amount is zero.

* * * * *